US007773660B2

(12) United States Patent
Schmandt et al.

(10) Patent No.: US 7,773,660 B2
(45) Date of Patent: Aug. 10, 2010

(54) FREQUENCY CHANNEL SELECTION IN A DATA TRANSMISSION METHOD WHICH USES A FREQUENCY HOPPING METHOD

(75) Inventors: Bernd Schmandt, Wuppertal (DE); Frank Gersemsky, Bochum (DE)

(73) Assignee: Infineon Technologies AG, Munich (DE)

(*) Notice: Subject to any disclaimer, the term of this patent is extended or adjusted under 35 U.S.C. 154(b) by 1249 days.

(21) Appl. No.: 10/799,001

(22) Filed: Mar. 12, 2004

(65) Prior Publication Data
US 2004/0240526 A1 Dec. 2, 2004

(30) Foreign Application Priority Data
Mar. 31, 2003 (DE) .................. 103 14 553

(51) Int. Cl.
*H04B 1/707* (2006.01)
(52) U.S. Cl. .................. 375/135; 375/132; 375/133; 375/134; 370/329; 370/330; 370/331; 370/332; 370/333; 370/334; 455/450
(58) Field of Classification Search ......... 375/132–135; 370/329–334; 455/450
See application file for complete search history.

(56) References Cited

U.S. PATENT DOCUMENTS

| 5,323,447 | A | * | 6/1994 | Gillis et al. ................ 455/464 |
| 5,418,839 | A | * | 5/1995 | Knuth et al. ............... 455/464 |
| 5,541,954 | A |   | 7/1996 | Emi |
| 5,887,022 | A |   | 3/1999 | Lee et al. |
| 6,052,407 | A |   | 4/2000 | Ciccone et al. |
| 6,480,721 | B1 |   | 11/2002 | Sydon et al. |
| 7,027,418 | B2 | * | 4/2006 | Gan et al. ................... 370/329 |
| 2003/0058923 | A1 | * | 3/2003 | Chen et al. ................. 375/133 |
| 2003/0147453 | A1 | * | 8/2003 | Batra ........................ 375/132 |

FOREIGN PATENT DOCUMENTS

| DE | 196 17 301 A1 | 11/1997 |
| DE | 199 31 244 A1 | 3/2000 |
| DE | 199 31 245 A1 | 3/2000 |
| DE | 199 31 369 A1 | 3/2000 |
| EP | 0 599 515 A1 | 11/1992 |
| EP | 1 220 466 A1 | 7/2002 |
| WO | WO 99/09671 A1 | 2/1999 |
| WO | WO 99/38344 | 7/1999 |
| WO | WO 99/55034 | 10/1999 |
| WO | WO 02/067469 A1 | 8/2002 |

* cited by examiner

*Primary Examiner*—David C Payne
*Assistant Examiner*—Leon Flores
(74) *Attorney, Agent, or Firm*—Eschweiler & Associates, LLC

(57) ABSTRACT

Frequency channel selection in a data transmission method uses a frequency hopping method. In a first method step, interference in a frequency channel is determined by detecting multiple erroneous transmissions in the frequency channel, and the frequency channel with interference is then eliminated from the frequency hopping sequence. In a second method step, the strength of external signals is measured within the frequency range of an eliminated frequency channel with interference, and the frequency channel is reinserted into the frequency hopping sequence if the strength is below a prescribed threshold value.

7 Claims, 1 Drawing Sheet

FREQUENCY CHANNEL SELECTION IN A DATA TRANSMISSION METHOD WHICH USES A FREQUENCY HOPPING METHOD

REFERENCE TO RELATED APPLICATIONS

This application claims the benefit of the priority date of German application DE 103 14 553.2, filed on Mar. 31, 2003, the contents of which are herein incorporated by reference in their entirety.

FIELD OF THE INVENTION

The present invention relates to a method for selecting frequency channels in a data transmission method that uses a frequency hopping method.

BACKGROUND OF THE INVENTION

Data transmission methods are used whenever data needs to be interchanged by radio over short distances, that is to say, by way of example, during data interchange between the base part and the mobile part of a cordless telephone. Other examples relate to the data interchange between a PC and peripheral units, between the gamepad on a gaming console and the associated fixed station etc.

For digital cordless communication systems, such as WDCT, Bluetooth, HomeRF, various licence-free frequency ranges are reserved, particularly the "ISM" (Industrial, Scientific and Medical) frequency ranges, for example, at 2.4 GHz. Data transmissions from the base station to the mobile stations is called "down-link". The opposite case of data transmission from the mobile stations to the base station is called "up-link". Normally, data bursts between the stations are interchanged on the basis of a timeslot method or TDMA (Time Division Multiple Access) method.

For use of the ISM frequency bands, the appropriate standardization authority, the Federal Communication Commission (FCC), has formulated rules for how data interchange is to take place. One of these rules states that wireless data transmission must take place in line with a frequency hopping method (frequency hopping spread spectrum). In addition, there is a stipulation for how many frequency changes need to be made within particular periods of time. The available frequency band is split into various sub-bands or frequency channels. During connection, the users' transceivers hop from one channel to the other on the basis of a pseudo-random pattern.

The Bluetooth method involves the use of a frequency hopping method and a time division duplex method. The channel is split into timeslots having a length of 625 μs each, with each individual time slot being assigned a dedicated hopping frequency. Each timeslot can transmit one packet. Consecutive timeslots are used alternately for transmitting and receiving (time division duplex, TDD).

The transmission quality of the data transmission systems described is significantly impaired by virtue of the ISM frequency band being open to anybody, which means that the radio systems operating in this frequency range have to be prepared for unforeseeable sources of interference, such as WLAN transmission devices, microwave ovens, baby monitors, garage door openers and other cordless telephones. These sources of interference usually have the property that they take up a portion of the ISM frequency band statically (e.g., WLAN). For this reason, not all channels in the frequency band have the same transmission quality. A method which uses a fixed hopping sequence therefore interferes with other systems and also has its transmission impaired on the channels with interference. It is therefore fundamentally appropriate to use an adaptive scheme which endeavours to look for a portion of the available frequency spectrum which is unused by sources of interference.

To date, transmission systems that are based on a frequency hopping method have used a stipulated hopping sequence. Errors in transmission have either been accepted or have been reduced by transmitting the data repeatedly (but not in the case of voice data). These measures show no consideration for the interfering system, whose transmission is likewise impaired by the collision. In other methods known from the prior art, channels with interference are readopted into the hopping sequence after a stipulated time, without checking whether the interference on these channels still exists. If the channels still have interference, they are then removed from the hopping sequence again. This necessitates increased communication complexity however, since both the re-adoption of the frequencies into the hopping sequence and the removal of the frequencies need to be communicated within the entire system. In addition, the interfering system is impaired during this time.

SUMMARY OF THE INVENTION

It is accordingly an object of the present invention to reduce the reciprocal impairment of the transmission quality between the actual system and external interfering systems with reduced communication complexity in a data transmission method that uses a frequency hopping method.

The inventive method involves frequency channels being selected in a data transmission method which uses a frequency hopping method. The method has two method steps. In a first method step, the interference in a frequency channel is determined and the frequency channel is eliminated from the hopping sequence, and a second method step ensures that the eliminated frequency channel is reinserted when the interference state has ended.

In particular, a first method step involves interference in a frequency channel being determined by detecting multiple erroneous transmissions in the frequency channel, and the channel then being eliminated from the frequency hopping sequence.

In a second method step, the signal strength of external signals is measured within the frequency range of an eliminated frequency channel with interference, and the frequency channel is reinserted into the frequency hopping sequence as soon as the signal strength is below a prescribed threshold value.

The two method steps are thus permanently performed concurrently for preferably all of the frequency channels in the hopping sequence.

In the first method step, it is thus a matter of determining an accumulation of erroneous transmissions in a frequency channel. This can be done in various ways. By way of example, it is possible to determine interference in a frequency channel if the number of erroneous transmissions exceeds the number of error-free transmissions by a prescribed threshold value within a period of time. In practice, this can be done by implementing a counter for each frequency channel and incrementing the counter when an erroneous transmission is determined and decrementing the counter when an error-free transmission is determined, and determining the interference in the frequency channel if the count exceeds a prescribed threshold value. In the case of this variant, said period of time is thus not firmly prescribed.

Interference in a frequency channel may also be determined in another way, however. By way of example, a fixed period of time may be prescribed from the outset and the erroneous and error-free transmissions within this period of time may be counted and interference determined if the ratio of the number of erroneous transmissions to the error-free transmissions exceeds a particular threshold value.

The erroneous nature of the transmitted data may be determined in a manner known per se by appending checksums, calculated from the user data in the data block, to the data blocks at the transmitter end. In the receiver, the checksum calculation is reconstructed and an error determined if said checksum does not match the checksum appended to the data block. This is frequently performed with cyclic redundancy checks (CRCs), where a redundant code is generated from the data in each data block and is added to the block for error detection or correction. In most cases, a CRC code is derived as a cyclic redundant code from the user data in a block using a predetermined algorithm. The CRC codes are generated by multiplying a user data signal train by a "generator polynomial". Following receipt of the code word, said code word is divided by the generator polynomial. If the code word received has been transmitted correctly, then the division produces no remainder. Conversely, if the division does produce a remainder, then the transmission is determined as having been erroneous.

As mentioned at the outset, the data transmission method may comprise a timeslot method (TDMA). When this method is used, there are usually one or more timeslots that are not used. In this case, the strength of external signals can be measured during such unused timeslots in the second method step.

For the rest, the measurement to be taken in the second method step can be taken as a field strength measurement, for example, as a measurement based on the inherently known RSSI (Radio Signal Strength Indication) method.

If the first method step is performed using a counter for each of the frequency channels, then in the second method step the counter can be decremented on the basis of a measurement taken during an unused timeslot if the measured signal strength from the source of interference is below a prescribed threshold value. In addition, provision can be made for a frequency channel identified as having interference to be reinserted into the frequency hopping sequence in the second method step as soon as the count reaches the value zero. Furthermore, the counter can be set to its maximum count in the second method step if the measured external signal strength exceeds a prescribed threshold value.

Provision can be made for the eliminated frequency channels to be entered into a table memory in a receiver's circuit arrangement. Any frequency channel entered in the table memory is not able to be involved in the frequency hopping sequence. As soon as the interference state has ended and the appropriate frequency channel has been erased from the table memory again, it can be involved in the frequency hopping sequence again.

The inventive method may be used, in particular, for the data transmission methods Bluetooth, WDCT, DECT or HomeRF.

DETAILED DESCRIPTION OF THE INVENTION

Figure 1:
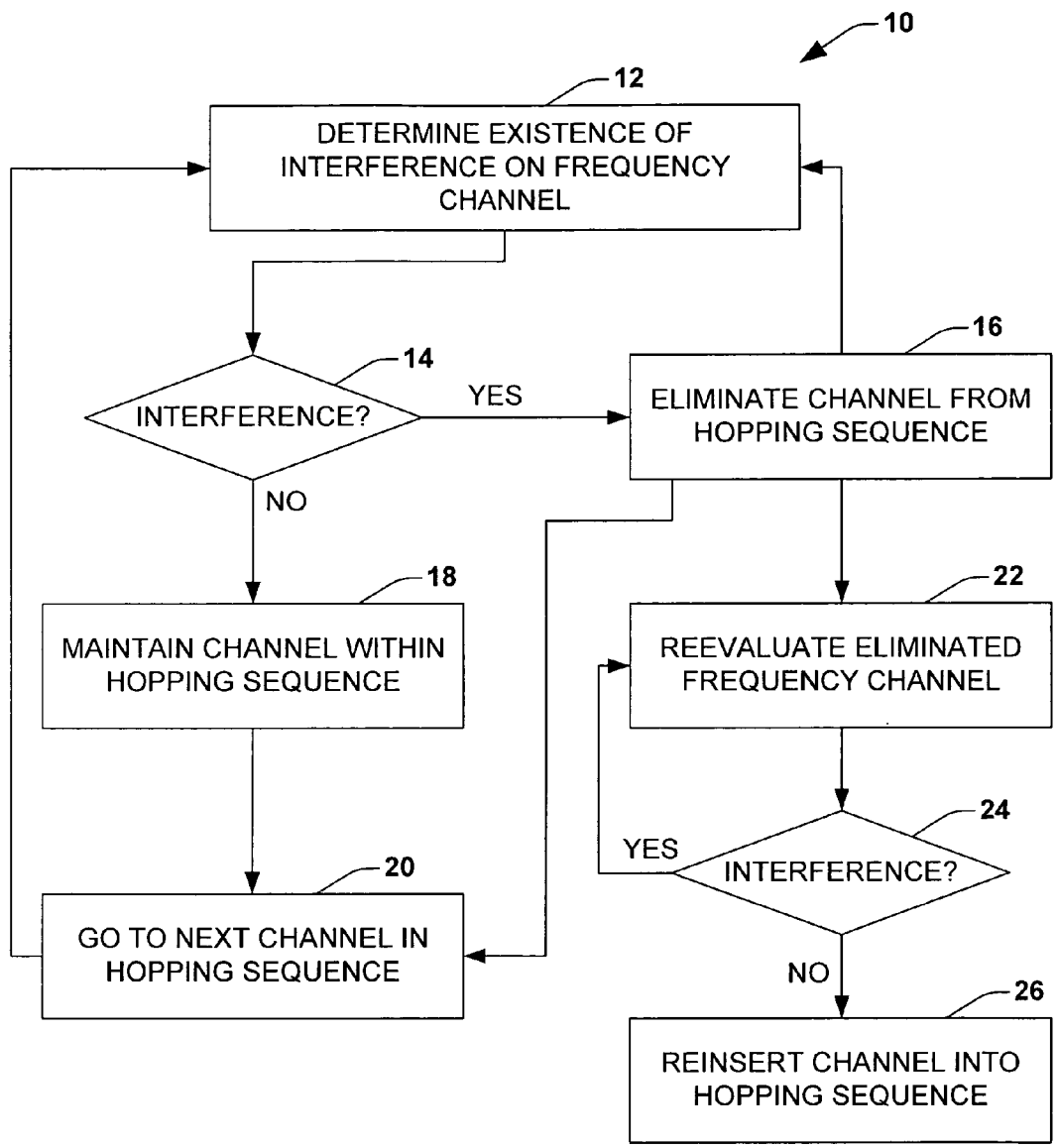
FIG. 1 is a flow chart diagram illustrating a method of performing frequency channel selection using a frequency hopping method in accordance with one aspect of the present invention.

The present invention is directed to a method of selecting frequency channels in the context of a frequency hopping data transmission methodology.

The method of the present invention is illustrated, in one example, in FIG. 1 and designated at reference numeral 10. Although the method 10 is illustrated and described below as a series of acts or events, it will be appreciated that the present invention is not limited by the illustrated ordering of such acts or events. For example, some acts may occur in different orders and/or concurrently with other acts or events apart from those illustrated and/or described herein, in accordance with the invention. In addition, not all illustrated steps may be required to implement a methodology in accordance with the present invention. Furthermore, the methods according to the present invention may be implemented in association with the devices and systems illustrated and described herein as well as in association with other structures not illustrated.

Initially, the method 10 begins at 12 with a determination of whether interference exists on a frequency channel, for example, within a channel in a Bluetooth system that employs 79 channels within the ISM frequency band. If a determination is made at 14 that interference exists on that particular channel (YES at 14), that channel is eliminated from the hopping sequence at 16. Conversely, if a determination is made that no interference exists on the channel (NO at 14), that channel is maintained within the hopping sequence at 18. In one example, eliminating a channel from the hopping sequence may include writing a channel entry into a table memory or register, wherein all entries therein represent channels that are presently skipped by the system in any future channel hopping sequencing.

In accordance with one example, the interference determination of acts 12, 14 is made by identifying the number of erroneous transmissions and error free transmissions occur on that channel within a predetermined time period (T). Using such data, one may define interference in various ways and each is contemplated by the present invention. For example, if the number of erroneous transmissions exceeds the number of error free transmissions on that channel within the predetermined time period by a predetermined amount (e.g., a threshold amount), an interference determination may be made.

Such a determination may be made using a counter, for example, wherein an identified erroneous transmission causes the counter to be incremented while an error free transmission results in the counter being decremented. In such an example, after the time period (T), the counter value may be compared to a predetermined threshold value with the determination of interference based on whether the counter exceeds the threshold. Alternatively, other criteria for interference may be employed and are contemplated by the present invention. For example, separate counters may be employed to account for erroneous and error free transmissions during a time period (T), resulting in count values A and B, respectively. A ratio (e.g., A/B) may then be calculated and compared to another predetermined threshold for a determination of whether interference exists on the channel.

The method 10 then proceeds to event 20, wherein an interference analysis is performed on another channel associated with the system. In the event that a channel was determined to have interference associated therewith, and is eliminated from the hopping sequence at 16, the method 10 may concurrently go to the another channel for analysis thereof at 20 and re-evaluate the eliminated frequency channel at 22.

In accordance with one exemplary aspect of the present invention, a re-evaluation of an eliminated channel from the hopping sequence comprises making a signal strength measurement, for example, based on RSSI. For example, in a TDMA type framework, an unused time slot may be utilized to evaluate the signal strength of interference on that particular channel. In such an instance, the measured interference strength may be compared to another threshold, and a counter may be adjusted (e.g., decremented) if the strength is less than such a threshold.

Accordingly, if the counter value reaches a predetermined count (e.g., zero), the method may re-insert that channel back into the hopping sequence at 26, for example, by removing the channel entry from a table memory or register associated therewith. Further, if the interference signal strength is measured as being exceptionally high (e.g., exceeding another threshold value), a counter may be forced to a maximum count condition, as may be desired.

One particular example of the present invention is provided below. In this exemplary embodiment, consideration is given to a Bluetooth system that initially uses all 79 frequencies (provided for the Bluetooth standard in the 2.4 GHz ISM frequency band) in its frequency hopping sequence. For each frequency, a counter is now implemented which is initially preloaded with the value zero. If an error occurs when a data packet is transmitted, this error being detected by receiving and evaluating the CRC code, for example, then the counter for the corresponding channel is incremented, the counter being decremented in the case of an error-free transmission. If the count exceeds a stipulated limit, then the corresponding frequency is eliminated from the hopping sequence. This prevents individual transmission errors from disabling the channel directly. Only permanent interference results in the corresponding channel being eliminated.

In the Bluetooth system, normally not all of the available timeslots are used for data transmission. In these unused timeslots, it is now possible to take a field strength measurement in the frequency range of the disabled channel. If the value of this measurement is now below a particular limit, then the corresponding counter can be decremented. If it reaches the value zero, for example, then the channel can be enabled again and inserted into the hopping sequence. If the measurement shows that there is still activity on the channel, i.e. the field strength is still above a particular other threshold value, then the counter is reset to the maximum value. This ensures that short breaks—such as frequently occur in WLAN systems—in the interfering system do not suggest a free channel. In this example, only when there are a fixed number of consecutive measurements is it possible to assume that the channel is available again and that the corresponding frequency can be reinserted into the hopping sequence.

The invention claimed is:

1. Method for selecting frequency channels in a cordless communication system by a data transmission method that uses a frequency hopping method, comprising:
determining an existence of interference on a frequency channel, comprising:
  (a) incrementing a counter each time an erroneous transmission on the frequency channel is identified;
  (b) decrementing the counter each time an error-free transmission on the frequency channel is identified;
  repeating the acts of (a) and (b) until the counter exceeds a maximum count; and
eliminating the frequency channel from a frequency hopping sequence when the counter exceeds the maximum count;
reinserting the frequency channel into the frequency hopping sequence, comprising:
  (c) decrementing the counter each time an error free transmission on the frequency channel is identified;
  (d) setting the counter to the maximum count each time an erroneous transmission on the frequency channel is identified;
  repeating acts (c) and (d) until the counter reaches a minimum count; and
reinserting the frequency channel into the frequency hopping sequence when the counter has reached the minimum count.

2. The method of claim 1, wherein detecting an erroneous transmission further comprises using checksums that are added to block-transmitted data at an end thereof.

3. The method of claim 2, wherein using checksums comprises adding a CRC (Cyclic Redundancy Check) code to each data block at the end thereof.

4. A method for data transmission between at least two stations via radio links using the frequency hopping method and the frequency channel selection method of claim 1.

5. The method of claim 4 wherein the method is based on one of the transmission standards Bluetooth, WDCT, DECT or HomeRF.

6. The method of claim 1, wherein re-inserting the frequency channel further comprises:
measuring an interference signal strength associated with the frequency channel; and
determining that interference no longer exists on the frequency channel when the measured interference signal strength is less than a predetermined amount.

7. The method of claim 6, wherein determining that interference no longer exists further comprises:
decrementing a counter when the measured signal strength is less than a predetermined threshold;
comparing a count of the counter to a predetermined value; and
determining that interference no longer exists when the count is less than or equal to the predetermined value.

* * * * *